3,382,113
METHOD OF EPITAXIALLY GROWING SILICON CARBIDE BY PYROLYTICALLY DECOMPOSING $SiH_4$ AND $CH_4$
Ekkehard Ebert, Boblingen, Martin Immendorfer, Sindelfingen, and Werner Spielmann, Dachtel, Germany, assignors to International Business Machines Corporation, Armonk, N.Y., a corporation of New York
Filed July 16, 1965, Ser. No. 472,615
Claims priority, application Germany, July 25, 1964, J 26,271
6 Claims. (Cl. 148—175)

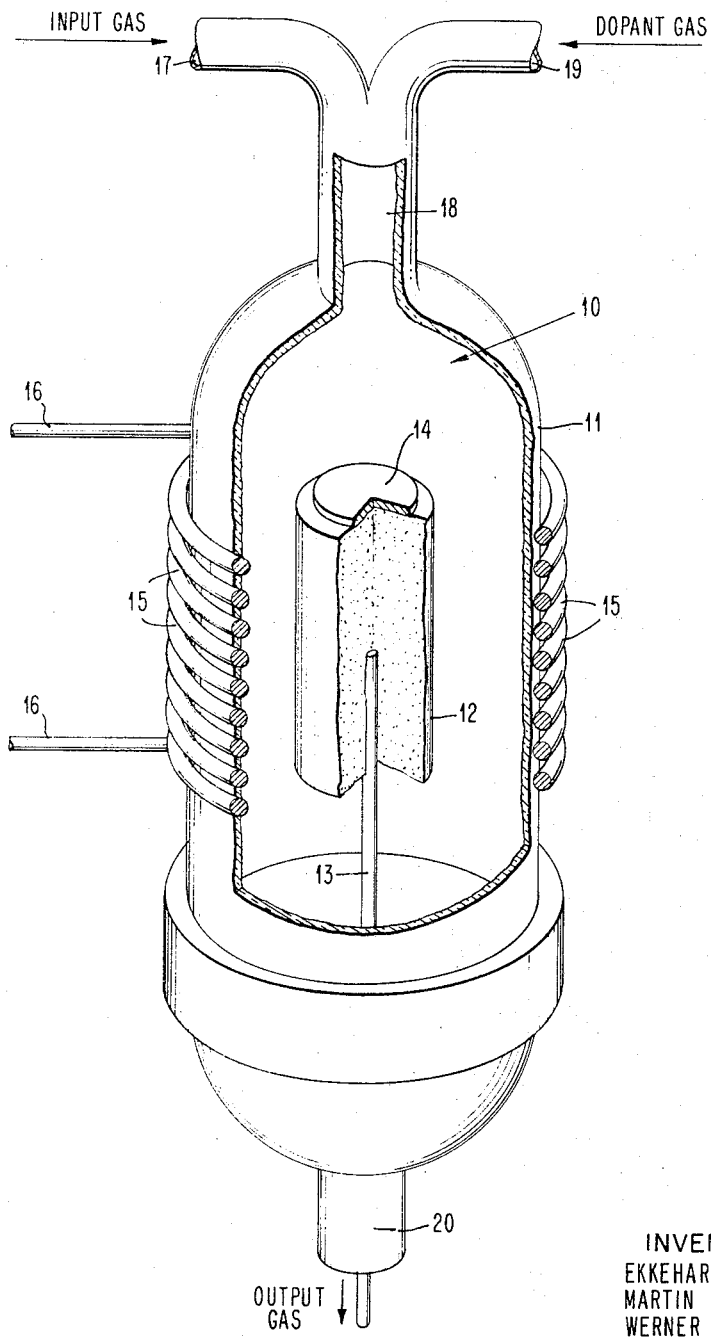

This invention relates to a method of epitaxially growing silicon carbide, and it relates more particularly to a process for producing silicon carbide semiconductor components.

Epitaxial growth of monocrystalline layers of silicon carbide, SiC, by gas transport has gained increasing importance lately in connection with the manufacture of semiconductor components. It has gained an especially high importance in connection with the fabrication of planar transistors in subminiaturized structures for printed circuits.

In the past, epitaxial layers of SiC have been produced by decomposition of $CCl_4$ and the hydrogen reduction of $SiCl_4$ at approximately 1800° C., using $H_2$ as a carrier gas. This method has a number of serious inherent disadvantages. Illustratively, due to the high chemical reactivity of hydrogen at 1800° C., chemical reactions tend to occur with the container walls and those parts of the apparatus serving to heat and support the seeds, which consist partly of graphite, resulting in disturbances of the growing process and of the crystalline structure of the grown layers. Further, the resulting HCl and $H_2$ become nascent in the reaction and attack the SiC, so that the crystalline growth is retarded and the production of sharply defined PN junctions is prevented. Additionally, the nascent HCl also reacts with a great number of doping substances, especially with gaseous dopants, thereby greatly limiting the selection of substances that may be used. A further disadvantage of the reaction is the very narrow temperature range available making it impossible to control the growing processes by changing the temperature in the reaction chamber.

It is an object of this invention to provide a method which avoids the above-mentioned disadvantages of the prior method. It is another object of this invention to provide an improved method of epitaxially growing SiC, especially for fabricating semiconductor components.

The foregoing and other objects, features and advantages of the invention will be apparent from the following more particular description of a preferred embodiment of the invention as illustrated in the accompanying drawing.

The drawing is a schematic perspective view of a reaction container partially broken away to expose the SiC seed and the support therefor in the reaction chamber.

The invention is characterized in that silanes and hydrocarbons are pyrolytically decomposed, and in that the SiC thus produced is precipitated on a seed.

In accordance with a particularly advantageous feature of the invention, an input gas stream comprising silicon hydride, $SiH_4$, and methane, $CH_4$, is pyrolytically decomposed into $H_2$ and SiC which is precipitated on a monocrystalline SiC seed at a temperature of 1400° C. to 2000° C. If required, inert carrier gases may be added to the input gas stream. Illustratively, if the inert gas is argon, Ar, the reaction is as follows:

$$SiH_4 + CH_4 + Ar \rightarrow SiC + 4H_2 + Ar$$

In accordance with another advantageous feature of the invention, the epitaxially grown layers are doped by adding gaseous dopants such as $B_2H_6$, BBr, $Al(BH_4)_3$ and $PH_3$, to the input gas stream consisting of silanes and hydrocarbons.

The invention now will be explained in detail with reference to the drawing. Mounted in a reaction chamber 10 of a reaction container 11, e.g., quartz, is a graphite or tantalum support block 12. The graphite block 12 is mounted on a stem 13 and supports a SiC seed 14 upon which a layer of SiC is to be epitaxially grown. The SiC seed 14 is heated to 1500° C. by heating the block 12 by means of induction coils 15 wound on container 11. Coils 15 are energized by a power source, not shown, connected to terminals 16. An input gas mixture consisting of $$SiH_4 + CH_4 + Ar$$

is directed into a tube 17 and therefrom via a tube 18 into chamber 10. The input gas mixture in the vicinity of the SiC seed 14 heated to 1000° C. decomposes into SiC and output gas $4H_2 + Ar$ causing an epitaxial precipitation of SiC on the seed 14. The output gas exits from chamber 11 via a tube 20 as result of the pressure differential in chamber 10 between the tube 18 and tube 20.

If it is desired that the epitaxially growing SiC layer be N or P doped, a gaseous mixture consisting of $PH_3$ or $N_2$ and $B_2H_6$, respectively, or $Al(BH_4)_3$ is introduced into a tube 19 and therefrom via tube 18 into the chamber 10 of reaction container 11 where it blends with the input gas mixture introduced through the tube 17.

When the method according to this invention is used, no HCl and only small quantities of $H_2$ are produced so that neither the apparatus nor the grown SiC layer is attacked, resulting in perfect crystal structures and in PN junctions which have almost any desired degree of sharpness. In particular, the absence of HCl permits the use of gaseous dopants, which are not converted into halides in the vicinity of the epitaxial layer as occur in the presence of HCl in the prior processes.

A further advantage of the method of this invention is the large temperature range available, the reactions taking place at 1500° C. to 2000° C., thereby making it possible to influence the growing process within wide limits by means of changes in temperature.

Another advantage of this invention is the use of hydride compounds of silicon making possible production of especially sharply defined PN junctions.

While the invention has been particularly shown and described with reference to a preferred embodiment thereof, it will be understood by those skilled in the art that various changes in form and details may be made therein without departing from the spirit and scope of the invention.

What is claimed is:
1. Method of epitaxially growing a layer of silicon carbide on a seed in a reaction chamber comprising the steps of:
   applying an input gas stream comprising $SiH_4$ and $CH_4$ to said chamber; and
   decomposing pyrolytically said $SiH_4$ and $CH_4$ in said chamber to effect said epitaxial growth of said layer by precipitation of said silicon carbide on said seed.

2. Method according to claim 1 wherein a semiconductor dopant gas is added to said input gas stream to obtain doping of said layer.

3. Method according to claim 2 wherein said dopant gas is selected from the group $B_2H_6$, BBr, $Al(BH_4)_3$ and $PH_3$.

4. Method according to claim 1 wherein said input gas stream contains an inert carrier gas to effect a pressure differential in said reaction chamber.

5. Method according to claim 4 wherein said inert carrier gas is Ar.

6. Method according to claim 5 wherein said input gas stream comprises $$SiH_4 + CH_4 + Ar$$

and said pyrolytic decomposition is at a temperature of 1400° C. to 2000° C., and said seed is monocrystalline SiC.

References Cited

UNITED STATES PATENTS

| | | | |
|---|---|---|---|
| 3,099,523 | 7/1963 | Reuschel et al. | 23—208 XR |
| 3,157,541 | 11/1964 | Heywang et al. | 148—174 |
| 3,177,100 | 4/1965 | Mayer et al. | 148—175 |
| 3,228,756 | 1/1966 | Hegenrother | 23—301 |

OTHER REFERENCES

RCA Technical Notes, TN No. 523, March 1962, Pankove et al., class 117/106.

HYLAND BIZOT, *Primary Examiner.*

DAVID L. RECK, *Examiner.*

P. WEINSTEIN, *Assistant Examiner.*